United States Patent
Park et al.

(10) Patent No.: US 9,244,171 B2
(45) Date of Patent: Jan. 26, 2016

(54) TOF CAMERA FOR VEHICLE AND METHOD FOR DRIVING THE SAME

(71) Applicant: MANDO CORPORATION, Pyeongtaek-si (KR)

(72) Inventors: Se Kyung Park, Seoul (KR); Seong Hee Jeong, Yongin-si (KR); Byung Sung Kim, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 14/316,543

(22) Filed: Jun. 26, 2014

(65) Prior Publication Data
US 2015/0185325 A1    Jul. 2, 2015

(30) Foreign Application Priority Data
Dec. 27, 2013    (KR) .................. 10-2013-0165320

(51) Int. Cl.
| | |
|---|---|
| *G01S 17/88* | (2006.01) |
| *G01C 3/08* | (2006.01) |
| *G01S 17/32* | (2006.01) |
| *G01S 17/89* | (2006.01) |
| *G01S 17/93* | (2006.01) |
| *G01S 7/481* | (2006.01) |
| *G01S 7/484* | (2006.01) |

(52) U.S. Cl.
CPC . *G01S 17/88* (2013.01); *G01C 3/08* (2013.01); *G01S 7/484* (2013.01); *G01S 7/4815* (2013.01); *G01S 17/32* (2013.01); *G01S 17/89* (2013.01); *G01S 17/936* (2013.01)

(58) Field of Classification Search
CPC ................... G01S 7/491; G01S 17/58–17/89
USPC ............ 356/3.01–3.15, 4.01–4.1, 5.01–5.15, 356/6–22, 28, 28.5
See application file for complete search history.

(56) References Cited

U.S. PATENT DOCUMENTS

| | | | | |
|---|---|---|---|---|
| 4,891,772 | A  * | 1/1990 | Case et al. .................... | 702/159 |
| 2009/0059201 | A1 * | 3/2009 | Willner et al. ............... | 356/5.01 |

* cited by examiner

*Primary Examiner* — Luke Ratcliffe
(74) *Attorney, Agent, or Firm* — Ladas & Parry, LLP

(57) ABSTRACT

A TOF camera for a vehicle includes a light emitting unit that irradiates light to an object, a light receiving unit that detects a distance to the object based on light reflected and returned from the object and generates a modulation signal for frequency modulation of the light, and a control unit that controls driving of the light emitting unit according to the modulation signal of the light receiving unit. The light emitting unit includes a plurality of laser diodes. The control unit decides a driving order of the laser diodes according to the modulation signal of the light receiving unit so as to control driving of the laser diodes, and decides current values of the laser diodes according to the modulation signal of the light receiving unit so as to control current amounts of laser diodes to be driven.

12 Claims, 8 Drawing Sheets

TOF CAMERA FOR VEHICLE AND METHOD FOR DRIVING THE SAME

CROSS-REFERENCE TO RELATED APPLICATION

This application claims priority to Korean Patent Application No. 10-2013-0165320, filed on Dec. 27, 2013, the disclosure of which is incorporated herein by reference in its entirety.

BACKGROUND OF THE INVENTION

1. Field of the Invention

Exemplary embodiments of the present invention relate to a TOF camera for a vehicle, and more particularly, to a TOF camera for a vehicle, which can increase a detection range by using a plurality of laser diodes as light sources, and a method for driving the same.

2. Description of the Related Art

In general, a TOF (Time of Flight) camera detects an object by using delay of a phase and the like generated when light modulated with a predetermined frequency is reflected and returned from the object, and is used in a topographical survey field, a gesture control field of an object, a rear-end collision prevention device of a vehicle, and the like.

According to the operation principle of the TOF camera, the TOF camera includes a light source that emits light having a predetermined center wavelength, and the light source modulates emitted light with a predetermined frequency and irradiates the light to an object to be detected.

Then, the light irradiated to the object is reflected and is returned to the TOF camera, and the TOF camera detects the returned light by using a sensor embedded therein.

In this case, the TOF camera compares a phase of the emitted light with a phase of the light reflected and returned from the object, thereby calculating the distance to the object.

FIG. 1 is a block diagram of a general TOF camera.

As illustrated in FIG. 1, the TOF camera may include a light receiving unit 10 that receives a reflection light reflected from an object 30 and a light emitting unit 20 that irradiates modulated light to the object 30.

The light emitting unit 20 controls each light emitting element 22 by using a modulation signal provided from the light receiving unit 10, thereby irradiating the modulated light to the object 30.

Then, the modulated light is reflected from the object 30 and is collected in a light receiving element 14 through a light receiving lens module 12 of the light receiving unit 10.

The light receiving element 14 converts light energy into electrical energy and transfers the electrical energy to a signal processing module 16, and the signal processing module 16 determines the distance to the object by using a phase difference between the input signal and the modulation signal.

However, since the existing TOF camera uses a light emitting diode as a light source, there is a problem that a detection range is short.

Accordingly, in the case of using a laser diode as a light source instead of the light emitting diode, since the laser diode can obtain relatively strong power as compared with the light emitting diode, it is possible to obtain an improved detection range when using the same current.

FIG. 2 is a graph obtained by comparing optical power characteristics of a light emitting diode and a laser diode with each other.

As illustrated in FIG. 2, it can be understood that the laser diode can obtain relatively strong power as compared with the light emitting diode when using the same current.

Accordingly, as compared with the light emitting diode, the laser diode has characteristics in which a detection range is improved and it is tolerant to external light due to a narrow wavelength band.

Since the TOF camera basically operates a light emitting element based on a modulation signal, it is necessary to operate a laser diode in a pulse mode.

However, a pulsed laser diode has high peak power but requires a long cooling time for removing generated heat at the time of light emitting.

Therefore, due to a long duty cycle of the laser diode, it may be difficult to operate the laser diode according to a fast modulation time of the TOF camera.

SUMMARY OF THE INVENTION

An object of the present invention is to provide a TOF camera for a vehicle, which improves a detection range by sequentially operating a plurality of laser diodes according to a modulation signal and is tolerant to external light, and a method for driving the same.

In accordance with one aspect of the present invention, a TOF camera for a vehicle includes: a light emitting unit that irradiates light to an object; a light receiving unit that detects a distance to the object based on light reflected and returned from the object, and generates a modulation signal for frequency modulation of the light; and a control unit that controls driving of the light emitting unit according to the modulation signal of the light receiving unit, wherein the light emitting unit includes: a plurality of laser diodes, wherein the control unit decides a driving order of the laser diodes according to the modulation signal of the light receiving unit so as to control driving of the laser diodes, and decides current values of the laser diodes according to the modulation signal of the light receiving unit so as to control current amounts of laser diodes to be driven.

The control unit may include: a driving order deciding section that decides the driving order of the laser diodes according to the modulation signal of the light receiving unit; a driving control section that controls the driving of the laser diodes according to the decided driving order; and a current control section that decides the current values of the laser diodes according to the modulation signal of the light receiving unit, and controls the current amounts of the laser diodes to be driven by a control signal of the driving control section.

The control unit may adjust the number of laser diodes to be driven according to duty cycles of the laser diodes, and control the driving of the light emitting unit.

The control unit may adjust the driving order of the laser diodes according to duty cycles of the laser diodes, and controls the driving of the light emitting unit.

In accordance with one aspect of the present invention, a method for driving a TOF camera for a vehicle includes: a step of deciding a driving order of the laser diodes according to the modulation signal of the light receiving unit; a step of controlling driving of the laser diodes according to the decided driving order; a step of deciding current values of the laser diodes according to the modulation signal of the light receiving unit, and controlling current amounts of laser diodes to be selectively driven by the driving order; and a step of applying a current corresponding to the decided current value to the laser diodes to be driven according to the driving order.

In accordance with an embodiment of the present invention, a plurality of laser diodes are sequentially operated according to a modulation signal, so that a detection range can be improved and the laser diodes are tolerant to external light, resulting in the improvement of the performance of the TOF camera for a vehicle.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Hereinafter, the present invention is described in more detail with reference to the accompanying drawings.

Suffixes "module" and "unit" for elements used hereinafter are simply assigned in consideration of the facilitation of creation of the present specification, and the "module" and "unit" may be mixed for use.

In addition, with reference to the accompanying drawings and content illustrated in the accompanying drawings, embodiments of the present invention are described, but the present invention is not limited or restricted by the embodiments.

As terms used in the present specification, general terms widely used at the present time are selected in consideration of functions in the present invention, but this may be changed according to the intention of ordinary skill in the art, custom, appearance of a new technology, and the like. In a specific case, there are terms arbitrarily selected by an applicant, and in this case, the meanings of the terms are written in a corresponding description of the present invention. Accordingly, the terms used in the present specification should not be construed as names of simple terms, but should be construed based on the actual meanings of the terms and content throughout the present specification.

Figure 1:
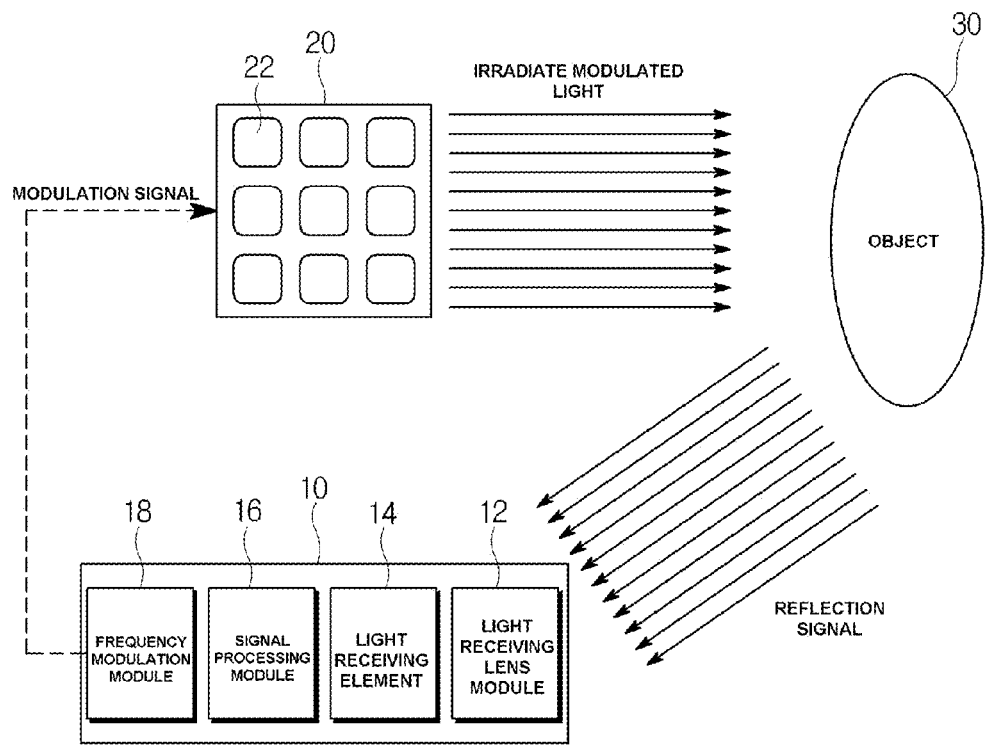
FIG. 1 is a block diagram of a general TOF camera.
Figure 2:
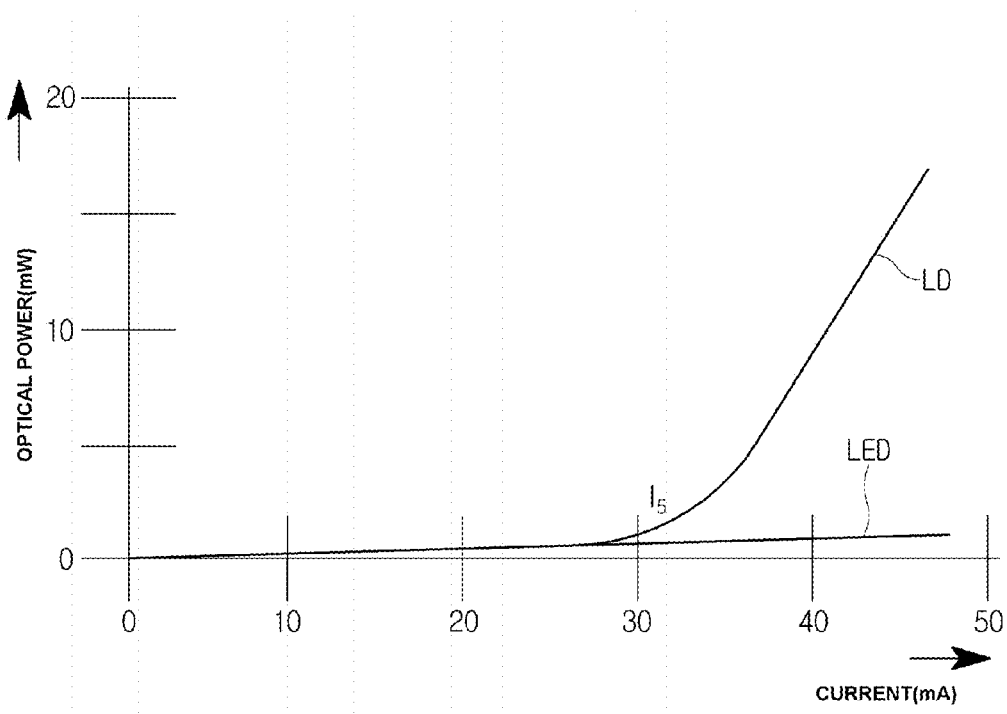
FIG. 2 is a graph obtained by comparing optical power characteristics of a light emitting diode and a laser diode with each other.
Figure 3:
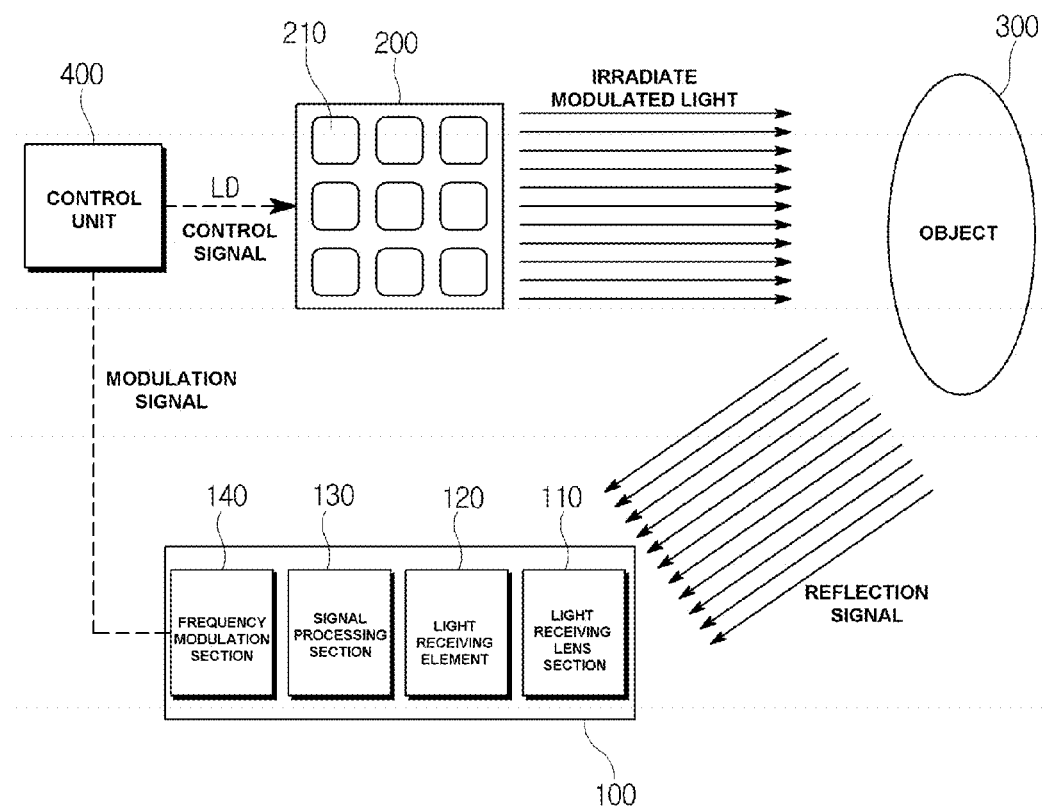
FIG. 3 is a block diagram of a TOF camera for a vehicle in accordance with the present invention.

FIG. 3 is a block diagram of a TOF camera for a vehicle in accordance with the present invention.

As illustrated in FIG. 3, the TOF camera of the present invention may include a light receiving unit 100 that generates a modulation signal and a light emitting unit 200 having a plurality of laser diodes 210.

In addition, the present invention may further include a control unit 400 that controls the driving of the light emitting unit 200 according to the modulation signal of the light receiving unit 100.

That is, the light emitting unit 200 of the present invention may irradiate light to an object 300, and the light receiving unit 100 may detect the distance to the object 300 based on light reflected and returned from the object 300, and generate a modulation signal for frequency modulation of the light.

The control unit 400 may control the driving of the light emitting unit 200 according to the modulation signal of the light receiving unit 100.

The light emitting unit 200 may include the plurality of laser diodes 210, wherein it is advantageous that the laser diode 210 can obtain relatively strong power as compared with the light emitting diode when using the same current.

Accordingly, as compared with the light emitting diode, the laser diode has characteristics in which a detection range is improved and it is tolerant to external light due to a narrow wavelength band.

Meanwhile, due to a long duty cycle, it is difficult to operate the laser diode according to a fast modulation time of the TOF camera. However, the control unit 400 can sequentially drive the plurality of laser diodes 210, thereby solving such a problem.

For example, the control unit 400 may control the driving of the laser diodes 210 by deciding a driving order of the laser diodes 210 according to the modulation signal of the light receiving unit 100, or control current amounts of laser diodes 210 to be driven by deciding current values of the laser diodes 210 according to the modulation signal of the light receiving unit 100.

That is, the control unit 400 may decide the driving order of the laser diodes 210 according to the modulation signal of the light receiving unit 100, and control the driving of the laser diodes 210 according to the decided driving order.

Furthermore, the control unit 400 may decide the current values of the laser diodes 210 according to the modulation signal of the light receiving unit 100, control current amounts of laser diodes 210 to be selectively driven by the driving order, and apply a current corresponding to the decided current value to the laser diodes 210 to be driven according to the driving order.

Figure 4:
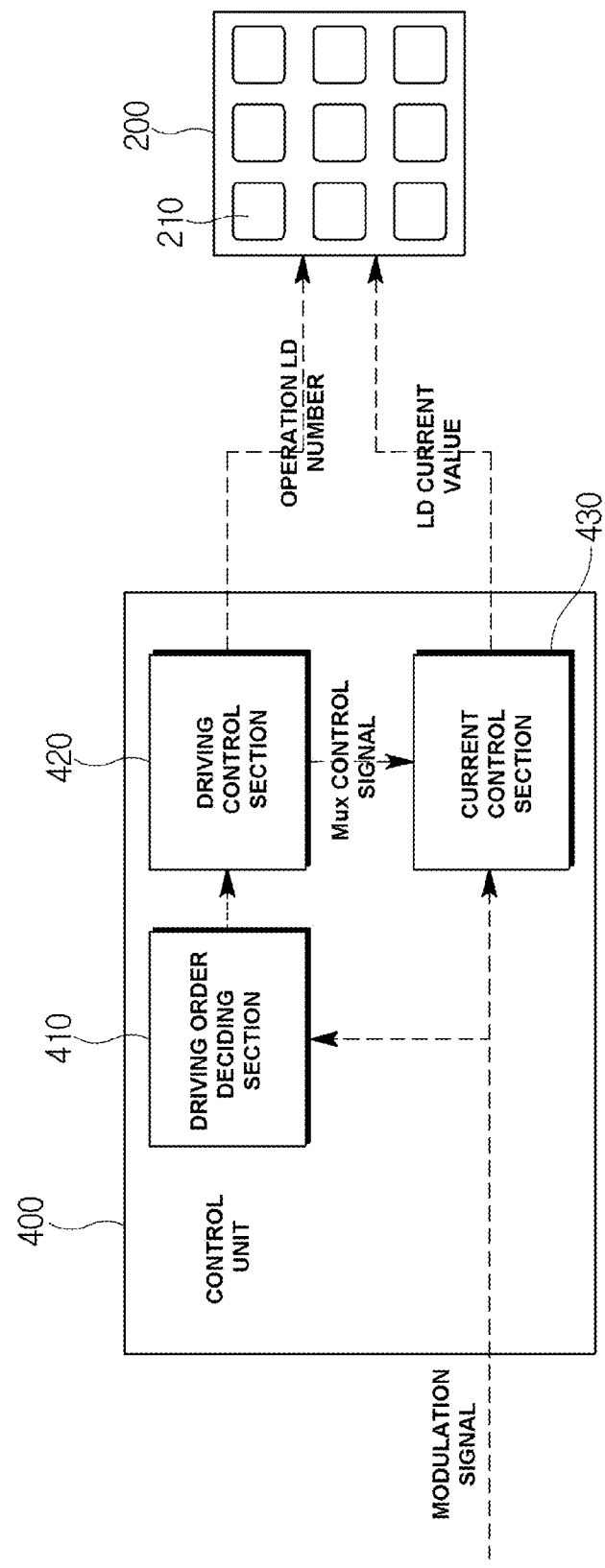
FIG. 4 is a block diagram of a control unit of FIG. 3.

FIG. 4 is a block diagram of the control unit of FIG. 3.

As illustrated in FIG. 4, the control unit 400 may include a driving order deciding section 410, a driving control section 420, and a current control section 430.

The driving order deciding section 410 may decide the driving order of the laser diodes according to the modulation signal of the light receiving unit.

According to situations, when the modulation signal is received from the light receiving unit, the driving order deciding section 410 may decide the driving order of the laser diodes according to a preset driving order of the laser diodes.

In another case, when the modulation signal is received from the light receiving unit, the driving order deciding section 410 may check whether there is a change request for the driving order of the laser diodes, and change the preset driving order of the laser diodes to another driving order of the laser diodes for decision when there is the change request.

Next, the driving control section 420 may control the driving of the laser diodes according to the decided driving order.

That is, the driving control section 420 may apply an enable signal to the laser diodes according to the decided driving order, and decide laser diodes to be driven.

The driving order deciding section 410 uses a circulation counter as an internal counter and sequentially drives laser diodes, and may decide the driving order of the laser diodes according to the preset driving order of the laser diodes.

According to situations, in the case of changing the driving order of the laser diodes according to a user's purpose, the driving order deciding section 410 may be replaced with a specific module that defines a driving order.

That is, when there is a change request for the driving order of the laser diodes from a user, the driving order deciding section 410 may change the preset driving order of the laser diodes to another driving order of the laser diodes for decision.

The other driving order of the laser diodes may be preset and stored in a memory.

Furthermore, when a separate cooling device is required according to the type of a laser diode, the driving order may be used as an operation enable signal of the separate cooling device.

For example, when the light emitting unit 200 includes a plurality of separate cooling devices for cooling the laser diodes 210, the driving control section 420 may control the driving of the cooling devices according to the decided driving order.

Next, the current control section 430 may decide the current values of the laser diodes according to the modulation signal of the light receiving unit, and control current amounts of laser diodes 210 to be driven by a control signal of the driving control section 420.

In order to adjust a light emitting amount of light according to the modulation signal, the current control section 430 may control current amounts supplied to the laser diodes.

According to situations, since the current control section 430 should transfer a current to each laser diode, the current control section 430 may include a multiplexer, and a current of an adjusted amount may be supplied to laser diodes to be driven by a control signal of the current control section 430.

As described above, the control unit 400 of the present invention may decide the driving order of the laser diodes 210 according to the modulation signal of the light receiving unit so as to control the driving of the laser diodes 210, and decide the current values of the laser diodes 210 according to the modulation signal of the light receiving unit so as to control the current amounts of laser diodes 210 to be driven.

That is, the control unit 400 may decide the driving order of the laser diodes 210 according to the modulation signal of the light receiving unit, and control the driving of the laser diodes 210 according to the decided driving order.

Furthermore, the control unit 400 may decide the current values of the laser diodes 210 according to the modulation signal of the light receiving unit, control the current amounts of laser diodes 210 to be selectively driven by the driving order, and apply a current corresponding to the decided current value to the laser diodes 210 to be driven according to the driving order.

Figure 5:
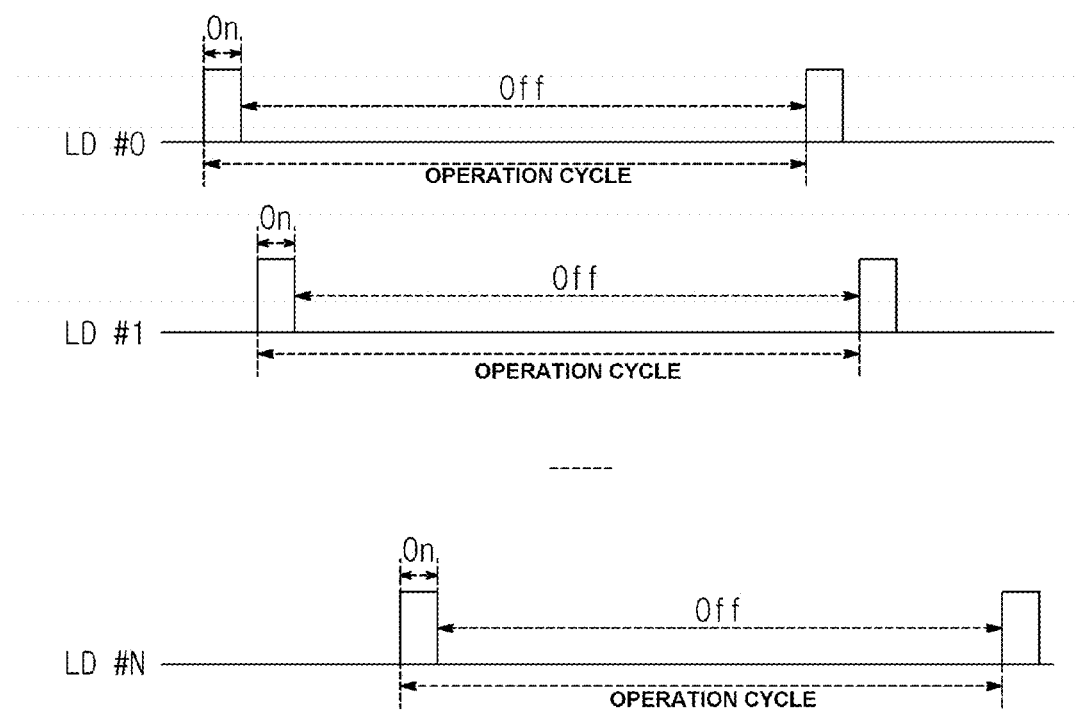
FIG. 5 is a diagram illustrating operation cycles of laser diodes sequentially driven by a control unit of FIG. 4.

FIG. 5 is a diagram illustrating operation cycles of laser diodes sequentially driven by the control unit of FIG. 4.

As illustrated in FIG. 5, the laser diode has high peak power but requires a long cooling time for removing generated heat at the time of light emitting.

Therefore, the laser diode may have a long operation cycle from a first driving time to a next driving time.

However, due to such a long duty cycle, it may be difficult to operate the laser diode according to a fast modulation time of the TOF camera.

In this regard, according to the present invention, a plurality of laser diodes are sequentially operated according to a TOF modulation signal, so that it is possible to compensate for the long duty cycle.

That is, the control unit of the present invention can decide laser diodes to be operated by using an internal counter, and control a light emitting amount of light of the corresponding laser diode according to a received modulation signal.

Consequently, according to the present invention, a plurality of laser diodes are sequentially operated according to the modulation signal, so that a detection range is improved and the laser diodes are tolerant to external light, resulting in the improvement of the performance of the TOF camera for a vehicle.

Figure 6:
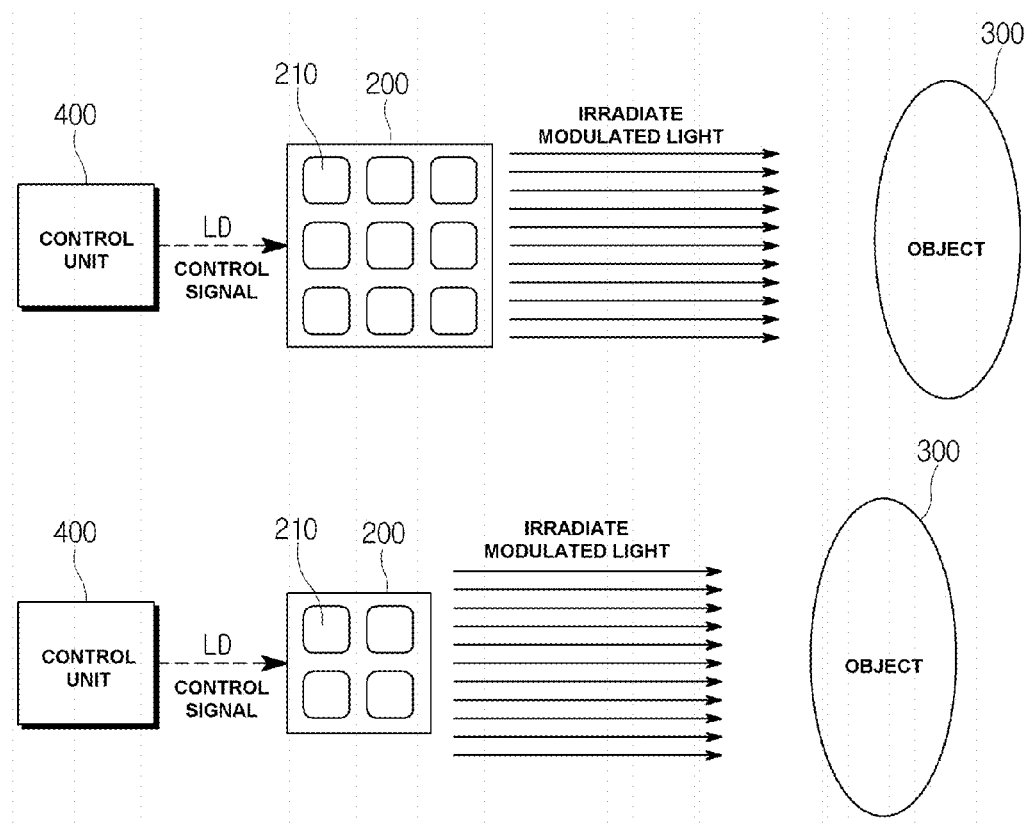
FIG. 6 is a diagram illustrating an embodiment in which the number of laser diodes to be driven is adjusted according to duty cycles of laser diodes.

FIG. 6 is a diagram illustrating an embodiment in which the number of laser diodes to be driven is adjusted according to duty cycles of laser diodes.

As illustrated in FIG. 6, the control unit 400 may adjust the number of the laser diodes 210 to be driven according to the duty cycles of the laser diodes 210, thereby controlling the driving of the laser diodes 210.

That is, according to the present invention, long duty cycles of laser diodes are compensated using a plurality of laser diodes, so that it is possible to adjust the number of the laser diodes according to the duty cycles of the laser diodes and the modulation signal.

For example, the control unit 400 may decrease the number of the laser diodes 210 to be driven when the duty cycles of the laser diodes 210 are short, and increase the number of the laser diodes 210 to be driven when the duty cycles of the laser diodes 210 are long, thereby controlling the driving of the light emitting unit 200.

Figure 7:
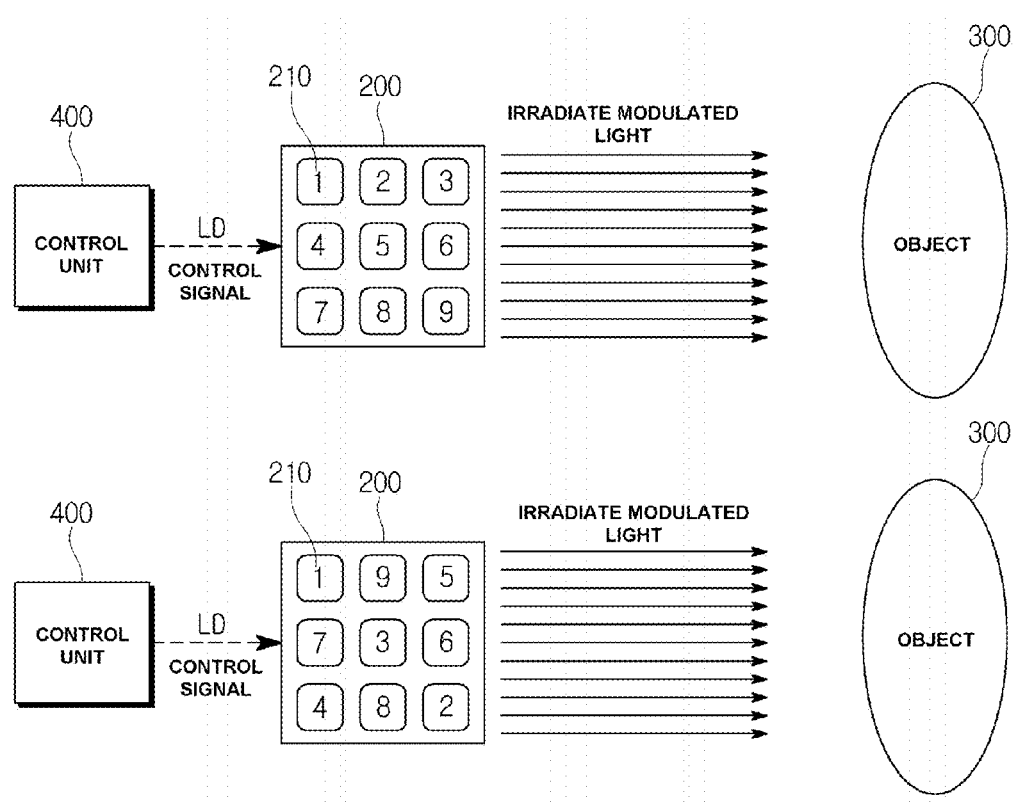
FIG. 7 is a diagram illustrating an embodiment in which a driving order of laser diodes is adjusted according to duty cycles of laser diodes.

FIG. 7 is a diagram illustrating an embodiment in which the driving order of laser diodes is adjusted according to duty cycles of laser diodes.

As illustrated in FIG. 7, the control unit 400 may adjust the driving order of the laser diodes 210 according to the duty cycles of the laser diodes 210, and control the driving of the light emitting unit 200.

For example, the control unit 400 may decide a driving order from the left to the right or from the top to the bottom according to an arrangement order of the laser diodes 210, and sequentially drive the light emitting unit 200.

However, the control unit 400 may irregularly decide the driving order according to the duty cycles of the laser diodes 210 regardless of the arrangement order of the laser diodes 210, and drive the light emitting unit 200.

Figure 8:
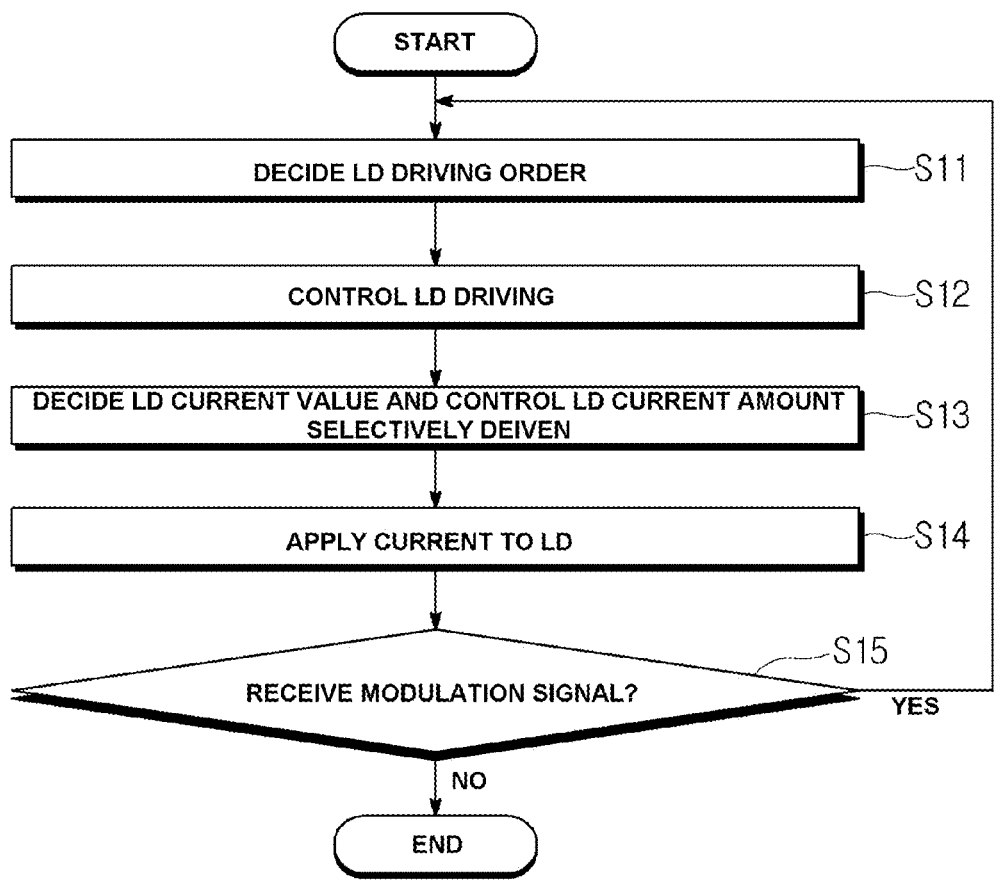
FIG. 8 is a flowchart for explaining a method for driving a TOF camera for a vehicle in accordance with the present invention.

FIG. 8 is a flowchart for explaining a method for driving the TOF camera for a vehicle in accordance with the present invention.

As illustrated in FIG. 8, the driving order deciding section of the control unit decides the driving order of the laser diodes according to the modulation signal of the light receiving unit (S11).

Next, the driving control section of the control unit controls the driving of the laser diodes according to the decided driving order (S12).

When the modulation signal is received from the light receiving unit, the driving control section of the control unit may decide the driving order of the laser diodes according to a preset driving order of the laser diodes.

However, according to situations, when the modulation signal is received from the light receiving unit, the driving control section of the control unit may check whether there is a change request for the driving order of the laser diodes, and change a preset driving order of the laser diodes to another driving order of the laser diodes for decision when there is the change request.

The other driving order of the laser diodes may be preset and stored in a memory.

The current control section of the control unit decides the current values of the laser diodes according to the modulation signal of the light receiving unit, and controls the current amounts of laser diodes to be selectively driven by the driving order (S13).

Then, the current control section of the control unit may apply a current corresponding to the decided current value to the laser diodes to be driven according to the driving order (S14).

Then, the driving order deciding section of the control unit checks whether the modulation signal generated from the light receiving unit is received (S15), and repeatedly performs the step (S11) of deciding the driving order of the laser diodes according to the modulation signal of the light receiving unit and the subsequent operations when the modulation signal is received.

However, when the modulation signal is not received, the operation control of the laser diodes may be ended.

As described above, according to the present invention, a plurality of laser diodes are sequentially operated according to the modulation signal, so that a detection range is improved and the laser diodes are tolerant to external light, resulting in the improvement of the performance of the TOF camera for a vehicle.

While the present invention has been described with respect to the specific embodiments, it will be apparent to those skilled in the art that various changes and modifications may be made without departing from the spirit and scope of the invention as defined in the following claims.

What is claimed is:

1. A TOF camera for a vehicle comprising:
   a light emitting unit that irradiates light to an object;
   a light receiving unit that detects a distance to the object based on light reflected and returned from the object, and generates a modulation signal for frequency modulation of the light; and
   a control unit that controls driving of the light emitting unit according to the modulation signal of the light receiving unit,
   wherein the light emitting unit comprises:
   a plurality of laser diodes,
   wherein the control unit decides a driving order of the laser diodes according to the modulation signal of the light receiving unit so as to control driving of the laser diodes, and decides current values of the laser diodes according to the modulation signal of the light receiving unit so as to control current amounts of laser diodes to be driven,
   wherein the control unit comprises:
   a driving order deciding section that decides the driving order of the laser diodes according to the modulation signal of the light receiving unit;
   a driving control section that controls the driving of the laser diodes according to the decided driving order; and
   a current control section that decides the current values of the laser diodes according to the modulation signal of the light receiving unit, and controls the current amounts of the laser diodes to be driven by a control signal of the driving control section, and
   wherein, when the modulation signal is received from the light receiving unit, the driving order deciding section decides the driving order of the laser diodes according to a preset driving order of laser diodes.

2. The TOF camera for a vehicle according to claim 1, wherein:
   when the modulation signal is received from the light receiving unit, the driving order deciding section checks whether there is a change request for the driving order of the laser diodes, and changes a preset driving order of laser diodes to another driving order of the laser diodes for decision when there is the change request.

3. The TOF camera for a vehicle according to claim 1, wherein:
   when the light emitting unit includes a plurality of separate cooling devices for cooling the laser diodes, the driving control section controls driving of the cooling devices according to the decided driving order.

4. The TOF camera for a vehicle according to claim 1, wherein:
   the current control section further comprises:
   a multiplexer that selects any one of the plurality of laser diodes according to a control signal of the driving control section, and outputs a current amount control signal of the selected laser diode.

5. The TOF camera for a vehicle according to claim 1, wherein:
   the control unit adjusts a number of laser diodes to be driven according to duty cycles of the laser diodes, and controls the driving of the light emitting unit.

6. The TOF camera for a vehicle according to claim 5, wherein:
   the control unit decreases the number of the laser diodes to be driven when the duty cycles of the laser diodes are short, and increases the number of the laser diodes to be driven when the duty cycles of the laser diodes are long, thereby controlling the driving of the light emitting unit.

7. The TOF camera for a vehicle according to claim 1, wherein:
   the control unit adjusts the driving order of the laser diodes according to duty cycles of the laser diodes, and controls the driving of the light emitting unit.

8. A method for driving a TOF camera for a vehicle including a light receiving unit that generates a modulation signal and a light emitting unit including a plurality of laser diodes, the method comprising:
   a step of deciding a driving order of the laser diodes according to the modulation signal of the light receiving unit;
   a step of controlling driving of the laser diodes according to the decided driving order;
   a step of deciding current values of the laser diodes according to the modulation signal of the light receiving unit, and controlling current amounts of laser diodes to be selectively driven by the driving order; and
   a step of applying a current corresponding to the decided current value to the laser diodes to be driven according to the driving order,
   wherein, in the step of deciding the driving order of the laser diodes, when the modulation signal is received from the light receiving unit, the driving order of the laser diodes is decided according to a preset driving order of laser diodes.

9. The method according to claim 8, wherein:
   the step of deciding the driving order of the laser diodes comprises:
   a step of checking whether there is a change request for the driving order of the laser diodes when the modulation signal is received from the light receiving unit; and
   a step of changing the preset driving order of the laser diodes to another driving order of the laser diodes for decision when there is the change request.

10. A TOF camera for a vehicle comprising:
    a light emitting unit that irradiates light to an object;
    a light receiving unit that detects a distance to the object based on light reflected and returned from the object, and generates a modulation signal for frequency modulation of the light; and
    a control unit that controls driving of the light emitting unit according to the modulation signal of the light receiving unit, wherein the light emitting unit comprises:

a plurality of laser diodes, wherein the control unit decides a driving order of the laser diodes according to the modulation signal of the light receiving unit so as to control driving of the laser diodes, and decides current values of the laser diodes according to the modulation signal of the light receiving unit so as to control current amounts of laser diodes to be driven, and wherein the control unit adjusts a number of laser diodes to be driven according to duty cycles of the laser diodes, and controls the driving of the light emitting unit.

11. The TOF camera for a vehicle according to claim 10, wherein:

the control unit decreases the number of the laser diodes to be driven when the duty cycles of the laser diodes are short, and increases the number of the laser diodes to be driven when the duty cycles of the laser diodes are long, thereby controlling the driving of the light emitting unit.

12. A TOF camera for a vehicle comprising:

a light emitting unit that irradiates light to an object;

a light receiving unit that detects a distance to the object based on light reflected and returned from the object, and generates a modulation signal for frequency modulation of the light; and a control unit that controls driving of the light emitting unit according to the modulation signal of the light receiving unit, wherein the light emitting unit comprises:

a plurality of laser diodes, wherein the control unit decides a driving order of the laser diodes according to the modulation signal of the light receiving unit so as to control driving of the laser diodes, and decides current values of the laser diodes according to the modulation signal of the light receiving unit so as to control current amounts of laser diodes to be driven, and wherein the control unit adjusts the driving order of the laser diodes according to duty cycles of the laser diodes, and controls the driving of the light emitting unit.

* * * * *